US006157919A

United States Patent [19]

Cordery et al.

[11] Patent Number: 6,157,919

[45] Date of Patent: *Dec. 5, 2000

[54] PC-BASED OPEN METERING SYSTEM AND METHOD

[75] Inventors: Robert A. Cordery, Danbury; David K. Lee, Monroe; Steven J. Pauly, New Milford; Leon A Pintsov, West Hartford; David W. Riley, Easton; Frederick W. Ryan, Jr., Oxford; Monroe A Weiant, Jr., Trumbull, all of Conn.

[73] Assignee: Pitney Bowes Inc., Stamford, Conn.

[ * ] Notice: This patent is subject to a terminal disclaimer.

[21] Appl. No.: 08/575,112

[22] Filed: Dec. 19, 1995

[51] Int. Cl.[7] .............................. G07B 17/00; H04L 9/00

[52] U.S. Cl. .............................. 705/60; 705/410; 705/62; 380/51

[58] Field of Search ................................. 380/25, 49, 51; 395/113, 117; 705/41, 400, 401, 402, 60, 61, 62, 410

[56] References Cited

U.S. PATENT DOCUMENTS

| | | | |
|---|---|---|---|
| 4,575,621 | 3/1986 | Dreifus . | |
| 4,725,718 | 2/1988 | Sansone et al. . | |
| 4,731,842 | 3/1988 | Smith . | |
| 4,757,537 | 7/1988 | Edelmann et al. . | |
| 4,774,500 | 9/1988 | Lichty . | |
| 4,775,246 | 10/1988 | Edelmann et al. | 380/23 |
| 4,802,027 | 1/1989 | Talmadge | 360/60 |
| 4,802,117 | 1/1989 | Chrosny et al. | 364/900 |
| 4,802,218 | 1/1989 | Wright | 380/23 |
| 4,807,059 | 2/1989 | Talmadge | 360/60 |

(List continued on next page.)

FOREIGN PATENT DOCUMENTS

| | | | |
|---|---|---|---|
| 0298775 | 7/1988 | European Pat. Off. . | |
| 0393896 | 4/1990 | European Pat. Off. . | |
| 0604148 | 12/1993 | European Pat. Off. . | |
| 0 717 378 | 12/1995 | European Pat. Off. | G07B 17/04 |
| 0775987A2 | 5/1997 | European Pat. Off. . | |
| WO 95/19016 | 7/1995 | WIPO . | |

OTHER PUBLICATIONS

*Embedded Device Drivers Simplify the Support of Unusual Devices Under Windows*: Gordon S Smith, Microsoft Systems Journal, (May 1991).

"Pitney Bowes Introduces Postperfect", Business Wire Sep. 12, 1995.

*Primary Examiner*—Pinchus M. Laufer

*Attorney, Agent, or Firm*—Charles R. Malandra, Jr.; Michael E. Melton

[57] ABSTRACT

A transaction evidencing system includes a personal computer (PC) comprising a processor, memory and hard drive, with a plurality of non-metering application programs that selectively run on the PC. An unsecured printer is operatively coupled to the PC for printing in accordance with the non-metering application programs. A portable vault card that is removably coupled to the PC is programmed to generate tokens generation and perform transaction accounting. An application interface module in the PC, which interfaces with the non-metering application programs, issues a request for digital tokens in response to requests for indicia from a non-metering application program. A secure communications module in the PC, which securely communicates with the vault card when the vault card is coupled to the PC, sends the request for digital token to the vault card and receives a digital token generated by the vault card. An indicia bitmap generation module generates an indicia bitmap in the PC from the digital token and stores it in memory. The indicia bitmap is accessed by the non-metering application program when a print indicia operation is selected. A transaction capture module in the PC stores on the hard drive a transaction record corresponding to each issued digital token and associated postal data. The application interface module, the secure communications module, the indicia bitmap generation module and the transaction capture module are part of a dynamic link library module in the PC.

23 Claims, 6 Drawing Sheets

U.S. PATENT DOCUMENTS

| | | | |
|---|---|---|---|
| 4,809,185 | 2/1989 | Talmadge . | |
| 4,809,326 | 2/1989 | Shigenaga . | |
| 4,812,994 | 3/1989 | Taylor et al. | 364/464.02 |
| 4,813,912 | 3/1989 | Chickneas . | |
| 4,831,555 | 5/1989 | Sansone et al. . | |
| 4,837,701 | 6/1989 | Sansone et al. | 364/464.03 |
| 4,853,523 | 8/1989 | Talmadge | 235/492 |
| 4,858,138 | 8/1989 | Talmadge | 364/464.02 |
| 4,862,375 | 8/1989 | Talmadge | 364/464.02 |
| 4,864,618 | 9/1989 | Wright et al. . | |
| 4,868,757 | 9/1989 | Gil | 364/464.03 |
| 4,873,645 | 10/1989 | Hunter et al. . | |
| 4,908,502 | 3/1990 | Jackson | 235/437 |
| 4,910,393 | 3/1990 | Gercekci et al. . | |
| 4,941,091 | 7/1990 | Breault et al. | 364/406 |
| 4,978,839 | 12/1990 | Chen et al. | 235/375 |
| 4,980,542 | 12/1990 | Jackson et al. . | |
| 4,985,920 | 1/1991 | Seki . | |
| 5,039,850 | 8/1991 | Yamaguchi . | |
| 5,111,030 | 5/1992 | Brasington et al. | 235/375 |
| 5,150,408 | 9/1992 | Bright . | |
| 5,173,862 | 12/1992 | Fedirchuk et al. . | |
| 5,175,424 | 12/1992 | Lisimaque . | |
| 5,197,055 | 3/1993 | Hartung et al. . | |
| 5,200,903 | 4/1993 | Gilham . | |
| 5,224,046 | 6/1993 | Kim et al. . | |
| 5,229,768 | 7/1993 | Thomas . | |
| 5,233,657 | 8/1993 | Gunther | 380/23 |
| 5,243,175 | 9/1993 | Kato . | |
| 5,257,197 | 10/1993 | Gunther . | |
| 5,283,828 | 2/1994 | Saunders et al. . | |
| 5,293,424 | 3/1994 | Holtey . | |
| 5,309,363 | 5/1994 | Graves . | |
| 5,309,558 | 5/1994 | Rourke et al. | 395/166 |
| 5,319,562 | 6/1994 | Whitehouse . | |
| 5,377,268 | 12/1994 | Hunter | 380/23 |
| 5,384,886 | 1/1995 | Rourke | 395/147 |
| 5,386,516 | 1/1995 | Monahan et al. . | |
| 5,388,260 | 2/1995 | Monahan et al. . | |
| 5,390,251 | 2/1995 | Pastor et al. | 380/21 |
| 5,437,441 | 8/1995 | Tuhro et al. | 270/1.1 |
| 5,448,641 | 9/1995 | Pintsov et al. | 380/51 |
| 5,454,038 | 9/1995 | Cordery et al. | 380/51 |
| 5,510,992 | 4/1996 | Kara | 364/464.02 |
| 5,606,613 | 2/1997 | Lee et al. | 705/62 |
| 5,655,023 | 8/1997 | Cordery et al. | 705/62 |
| 5,778,066 | 7/1998 | Shah et al. | 380/51 |

PC-BASED OPEN METERING SYSTEM AND METHOD

RELATED APPLICATIONS

The present application is related to the following U.S. patent applications Ser. Nos. 08/575,106 now U.S. Pat. No. 5,625,694 issued on Apr. 29, 1997, 08/575,107 now U.S. Pat. No. 5,781,438 issued on Jul. 14, 1998; 08/574,746 now U.S. Pat. No. 5,835,604 issued on Nov. 10, 1998; 08/574,745 now U.S. Pat. No. 5,742,683 issued on Apr. 21, 1998; 08/574,743 now U.S. Pat. No. 5,793,867 issued on Aug. 11, 1998; 08/575,110; 08/575,109; 08/575,104 now U.S. Pat. No. 5,835,689 issued on Nov. 10, 1998; 08/574,749 now U.S. Pat. No. 5,590,198 issued on Dec. 31, 1996, and 08/575,111 now abandoned each filed concurrently herewith, and assigned to the assignee of the present invention.

FIELD OF THE INVENTION

The present invention relates generally to value printing systems and, more particularly, to value printing systems wherein a printer is not dedicated to a metering module.

BACKGROUND OF THE INVENTION

Since the issuance of U.S. Pat. No. 1,530,852 to Arthur H. Pitney, the postage meter has evolved from completely mechanical postage meters to meters that incorporate extensive use of electronic components. Although postage meters have performed satisfactorily in the past, and continue to perform satisfactorily, with the advancement in computer controlled digital printing technology, the United States Postal Service (USPS) and other Posts are considering requirements for new technology metering devices.

The USPS is presently considering requirements for two metering device types: closed systems and open systems. In a closed system, the system functionality is solely dedicated to metering activity. Examples of closed system metering devices, also referred to as postage evidencing devices (PEDs), include conventional digital and analog postage meters wherein a dedicated printer is securely coupled to a metering or accounting function. In a closed system, since the printer is securely coupled and dedicated to the meter, printing cannot take place without accounting. Recently, Pitney Bowes Inc. has introduced the Post Perfect™ meter which is a new closed system metering device that includes a dedicated digital printer securely coupled to a secure accounting module.

In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a PED with a non-dedicated printer that is not securely coupled to a secure accounting module.

When a PED prints postage indicia on a mailpiece, the accounting register within the PED must always reflect that the printing has occurred. Postal authorities generally require the accounting information to be stored within the postage meter in a secure manner with security features that prevent unauthorized and unaccounted for postage printing or changes in the amounts of postal funds stored in the meter. In a closed system, the meter and printer are integral units, i.e., interlocked in such a manner as to ensure that the printing of postage indicia cannot occur without accounting.

Since an open system PED utilizes a printer that is not used exclusively for printing proof of postage payment, additional security measures are required to prevent unauthorized printing evidence of postage payment. Such security measures include cryptographic evidencing of postage payment by PEDs in the open and closed metering systems. The postage value for a mail piece may be encrypted together with other data to generate a digital token. A digital token is encrypted information that authenticates the information imprinted on a mail piece including postage values.

Examples of systems for generating and using digital tokens are described in U.S. Pat. Nos. 4,757,537, 4,831,555, 4,775,246, 4,873,645, and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as postal data, when encrypted with a secret key and printed on a mail piece provide a very high level of security which enables the detection of any attempted modification of a postal revenue block or a destination postal code. A postal revenue block is an image printed on a mail piece that includes the digital token used to provide evidence of postage payment. The postal data may be printed both in encrypted and unencrypted form in the postal revenue block. Postal data serves as an input to a Digital Token Transformation which is a cryptographic transformation computation that utilizes a secret key to produce digital tokens. Results of the Digital Token Transformation, i.e., digital tokens, are available only after completion of the Accounting Process. As used herein "digital token" may be an encryption of all postal data or a subset thereof.

Digital tokens are utilized in both open and closed metering systems. However, for open metering systems, the non-dedicated printer may be used to print other information in addition to the postal revenue block and may be used in activity other than postage evidencing. In an open system PED, addressee information is included in the postal data which is used in the generation of the digital tokens. Such use of the addressee information creates a secure link between the mailpiece and the postal revenue block and allows unambiguous authentication of the mail piece.

Preferably, two digital tokens are used to authenticate postal data and postage payment. The first is produced by a Digital Token Transformation using a secret key held by the Postal Service and the mailer's PED. The second is produced by a Digital Token Transformation using a secret key held by the PED vendor and the mailer's PED. The fact that two independent entities hold separate verification secrets greatly enhances the security of the system because it provides the Postal Service and the vendor with independent means to authenticate the postal revenue block, and thus, verify postage payment. The use of the second Digital Token Transformation using the vendor's secret key is an optional part of the security which authenticates postage payment by a particular vendor's device. The use of two digital tokens (postal and vendor) is described in U.S. patent application Ser. No. 08/133,427 filed Oct. 8, 1993, issued as U.S. Pat. No. 5,390,251 Feb. 14, 1995 and Ser. No. 08/242,564, filed May 13, 1994, U.S. Pat. No. 5,655,023 issued Aug. 5, 1997 both assigned to the assignee of the present invention, the entire disclosures of which are hereby incorporated by reference.

SUMMARY OF THE INVENTION

In accordance with the present invention some of the functionality typically performed in the vault of a conventional postage meter has been removed from the vault of a PC-based open metering system and is performed in the PC. It has been discovered that this transfer of functionality from the vault to the PC does not effect the security of the meter because the security of the PC-based open metering system is in the information being processed not in the meter itself.

Thus, the present invention provides a PC-based open metering system that comprises a PC, special Windows-based software, a printer and a plug-in peripheral as a vault to store postage funds. The PC meter uses a personal computer and its non-secure and non-dedicated printer to print postage on envelopes and labels at the same time it prints a recipient address.

The present invention provides a PC based open meter system, which consists of a personal computer (PC), a digital printer, a removable electronic vault, an optional modem for funds recharge (debit or credit), a PC software module in the form of a Dynamic Link Library (DLL) and a user interface module. The vault is a secure encryption device for digital token generation, funds management and traditional accounting functions. The DLL module performs all communications with the vault, and provides an open interface to Windows-based applications. Secure communication between the DLL and the vault is desired but is not necessary for system security. The DLL module obtains from the vault transaction records comprising digital tokens issued by the vault and associated postal data and generates an electronic indicia image. The usage of postal funds and the transaction record are stored in the vault. Another copy of the usage of postal funds and the transaction record may be stored on the PC's hard drive as backup. The user interface module obtains the electronic indicia image from the DLL module for printing the postal revenue block on a document, such as an envelope. The user interface also communicates with the vault via the DLL for remote refills and for performing administrative functions.

The present invention provides open system metering that includes security to prevent tampering and false evidence of postage payment as well as the ability to do batch processing of envelopes, review of indicia and addressing on envelope before printing.

In accordance with the present invention a transaction evidencing system includes a personal computer (PC) comprising a conventional processor, memory and hard drive, with a plurality of non-metering application programs that selectively run on the PC. An unsecured printer is operatively coupled to the PC for printing in accordance with the non-metering application programs. A portable vault card that is removably coupled to the PC is programmed to generate tokens and perform transaction accounting. An application interface module in the PC, which interfaces with the non-metering application programs, issues a request for digital tokens in response to requests for indicia from a non-metering application program. A secure communications module in the PC, which securely communicates with the vault card when the vault card is coupled to the PC, sends the request for digital token to the vault card and receives a digital token generated by the vault card. An indicia bitmap generation module generates an indicia bitmap in the PC from the digital token and stores it in memory. The indicia bitmap is accessed by the non-metering application program when a print indicia operation is selected. A transaction capture module in the PC stores on the hard drive a transaction record corresponding to each issued digital token and associated postal data. The application interface module, the secure communications module, the indicia bitmap generation module and the transaction capture module are part of a dynamic link library module in the PC.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
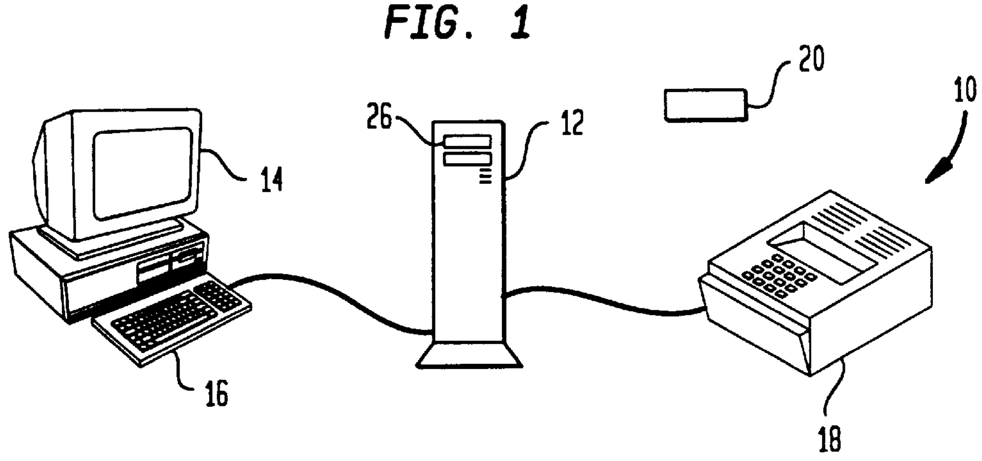
FIG. 1 is a block diagram of a PC-based metering system in accordance with the present invention.
Figure 2:
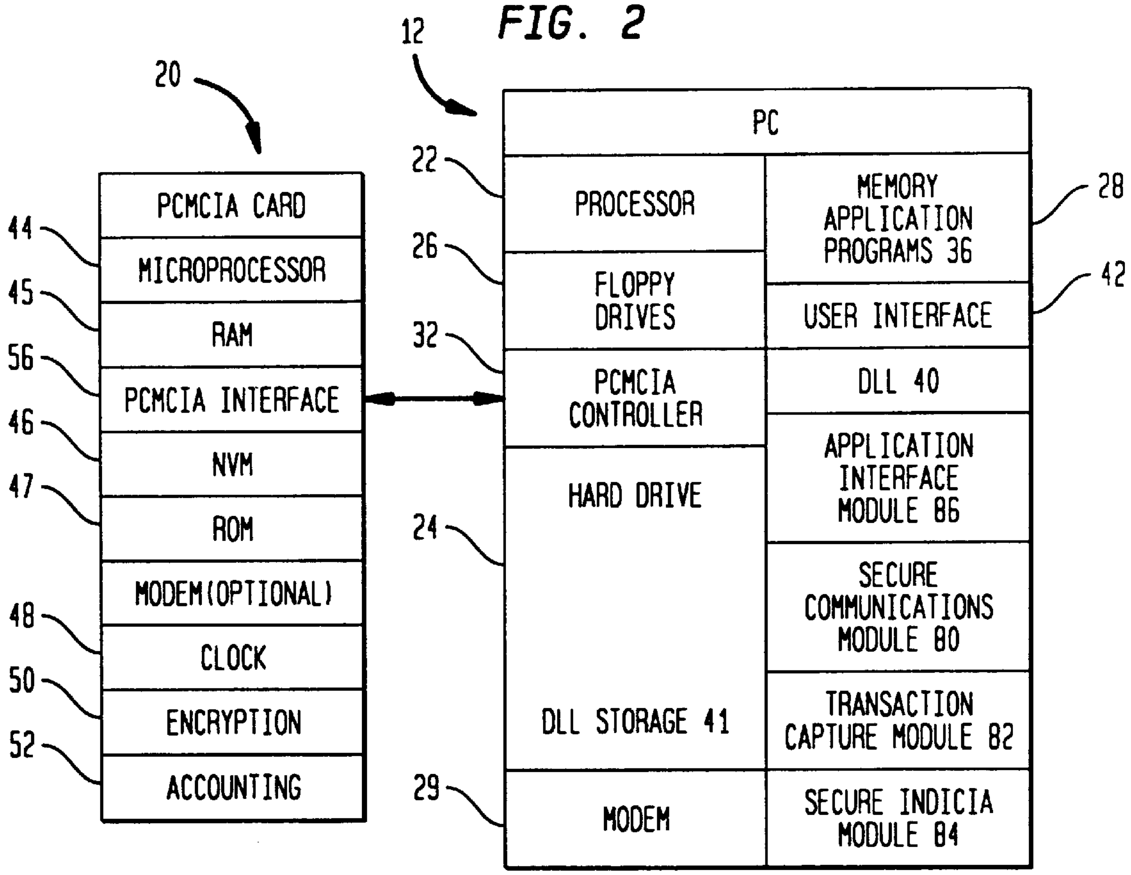
FIG. 2 is a schematic block diagram of the PC-based metering system of FIG. 1 including a removable vault card and a DLL in the PC.

In describing the present invention, reference is made to the drawings, wherein there is seen in FIGS. 1 and 2 an open system PC-based postage meter, also referred to herein as a PC meter system, generally referred to as 10, comprising a conventional personal computer configured to operate as a host to a removable metering device or electronic vault, generally referred to as 20, in which postage funds are stored. PC meter system 10 uses the personal computer and its printer to print postage on envelopes at the same time it prints a recipient's address or to print labels for pre-addressed return envelopes or large mailpieces. It will be understood that although the preferred embodiment of the present invention is described as a postage metering system, the present invention is applicable to any value metering system that includes transaction evidencing.

As used herein, the term personal computer is used generically and refers to present and future microprocessing systems with at least one processor operatively coupled to user interface means, such as a display and keyboard, and storage media. The personal computer may be a workstation that is accessible by more than one user.

The PC-based postage meter 10 includes a personal computer (PC) 12, a display 14, a keyboard 16, and an unsecured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as PCMCIA card 30, is a secure encryption device for postage funds management, digital token generation and traditional accounting functions. PC meter system 10 may also include an optional modem 29 which is located preferably in PC 12. Modem 29 may be used for communicating with a Postal Service or a postal authenticating vendor for recharging funds (debit or credit). A description of such communication by modem is described in U.S. Pat. No. 4,831,555, incorporated herein by reference. In an alternate embodiment the modem may be located in PCMCIA card 30.

PC meter system 10 further includes a Windows-based PC software module 34 (FIGS. 3 and 4) that is accessible from conventional Windows-based word processing, database and spreadsheet application programs 36. PC software module 34 includes a vault dynamic link library (DLL) 40, a user interface module 42 (FIG. 2), and a plurality of sub-modules that control the metering functions. The DLL is an application programming interface (API) that is used by in Windows-based programs. It will be understood that the present invention is suitable for use with an API corresponding to other than Windows-based programs.

DLL module 40 securely communicates with vault 20 and provides an open interface to Microsoft Windows-based application programs 36 through user interface module 42. DLL module 40 also securely stores an indicia image and a copy of the usage of postal funds of the vault. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

Thus, PC-based meter system 10 operates as a conventional personal computer with attached printer that becomes a postage meter upon user request. Printer 18 prints all documents normally printed by a personal computer, including printing letters and addressing envelopes, and in accordance with the present invention, prints postage indicia.

A description of the key components of PC-based meter system 10 are described below followed by a description of the preferred operation of PC-based meter system 10. A description of the digital token generation process is disclosed in co-pending U.S. patent application Ser. Nos. 08/575,106, 08/575,107 and 08,574,743, previously noted, which are incorporated herein in their entirety by reference.

The Vault

In the preferred embodiment of the present invention, the vault is housed in a PCMCIA I/O device, or card, which is accessed through a PCMCIA controller 32 in PC 12. A PCMCIA card is a credit card size peripheral or adapter that conforms to the standard specification of the Personal Computer Memory Card International Association.

Figure 3:
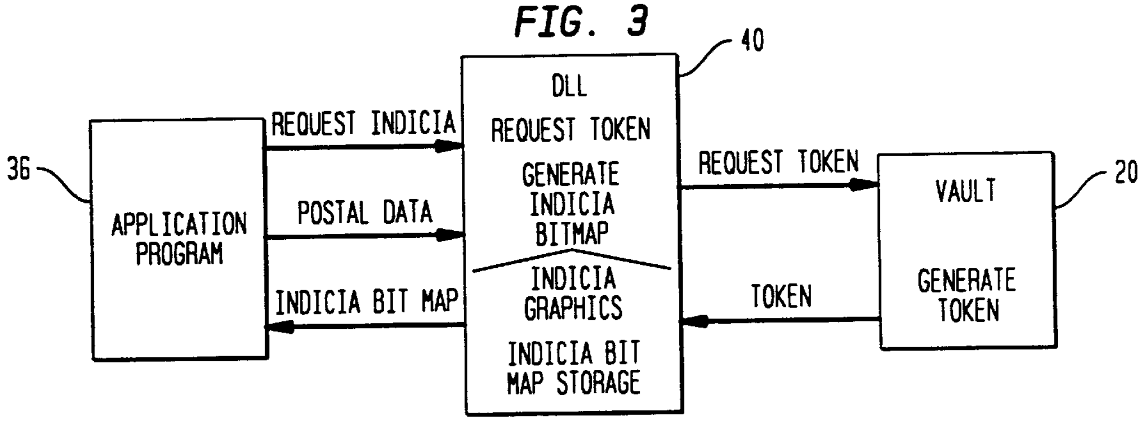
FIG. 3 is a schematic block diagram of the DLL in the PC-based metering system of FIG. 1 including interaction with the vault to generate indicia bitmap.
Figure 4:
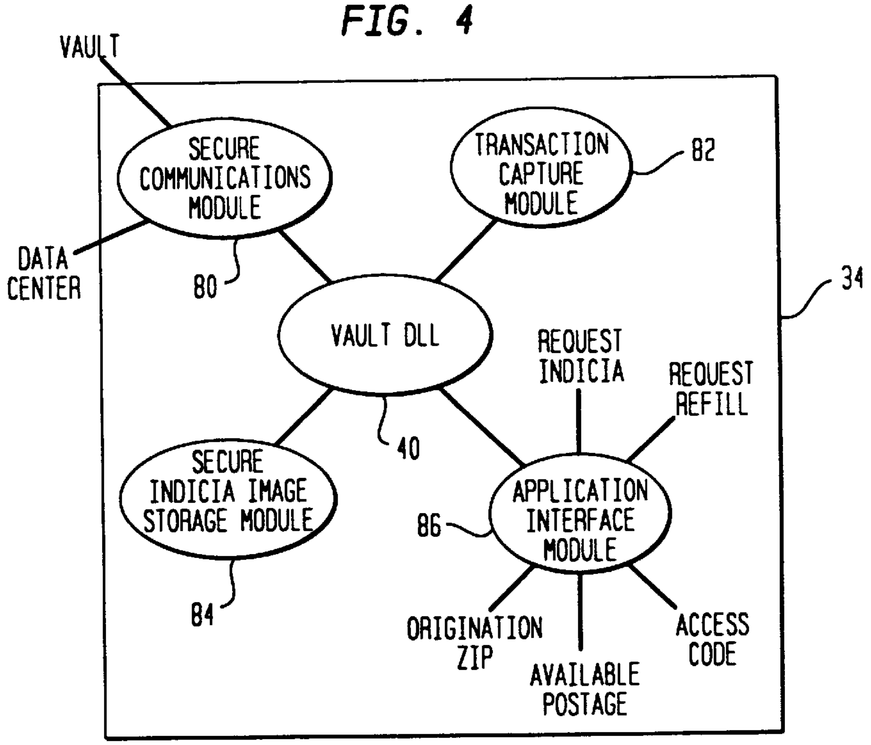
FIG. 4 is a block diagram of the DLL sub-modules in the PC-based metering system of FIG. 1.

Referring now to FIGS. 2 and 3, the PCMCIA card includes a microprocessor 44, non-volatile memory (NVM) 46, clock 48, an encryption module 50 and an accounting module 52. The encryption module 50 may implement the NBS Data Encryption Standard (DES) or another suitable encryption scheme. In the preferred embodiment, encryption module 50 is a software module. It will be understood that encryption module 50 could also be a separate device, such as a separate chip connected to microprocessor 44. Accounting module 52 may be EEPROM that incorporates ascending and descending registers as well as postal data, such as origination ZIP Code, vendor identification, data identifying the PC-based postage meter 10, sequential piece count of the postal revenue block generated by the PC-based postage meter 10, postage amount and the date of submission to the Postal Service. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The hardware design of the vault includes an interface 56 that communicates with the host processor 22 through PCMCIA controller 32. Preferably, for added physical security, the components of vault 20 that perform the encryption and store the encryption keys (microprocessor 44, ROM 47 and NVM 46) are packaged in the same integrated circuit device/chip that is manufactured to be tamper proof. Such packaging ensures that the contents of NVM 46 may be read only by the encryption processor and are not accessible outside of the integrated circuit device. Alternatively, the entire card could be manufactured to be tamper proof.

In accordance with the present invention, the open system vault 20 is strictly a slave device to PC 12. Host processor 22 generates a command and vault 20 replies with a response. The vault 20 does not generate unsolicited messages. Thus, PC 12 requests vault status whenever any transaction is initiated.

Figure 5:
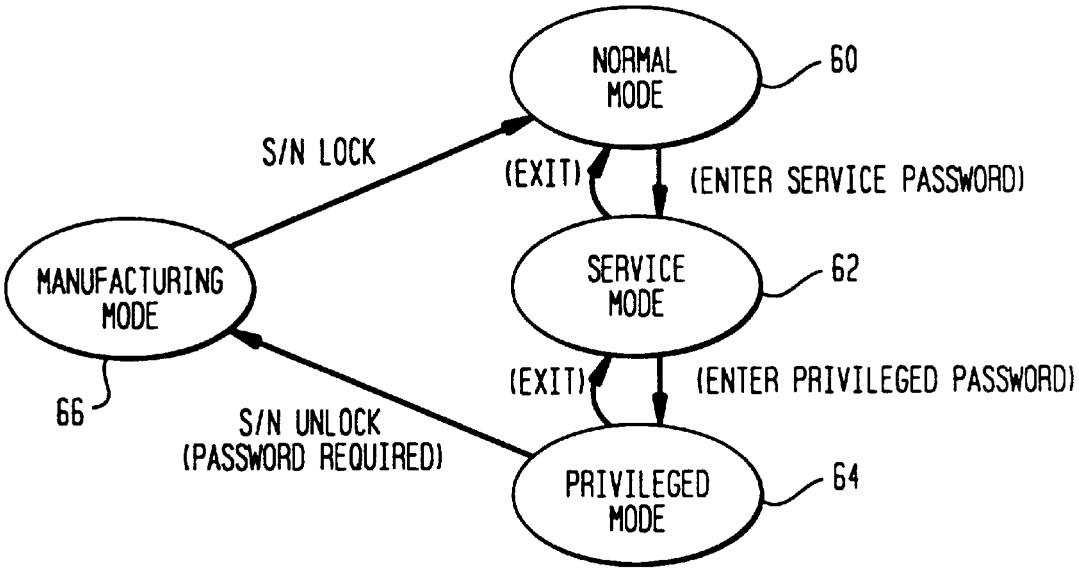
FIG. 5 is a flow diagram of vault mode transitions in the PC-based metering system of FIG. 1.

Referring now to FIG. 5, vault 20 has four security access levels: normal mode 60, service mode 62, privileged mode 64 and manufacturing mode 66. In normal mode 60, commands available to users are processed. In service mode 62, normal mode commands and service related commands are processed. In privilege mode 64, all commands except direct access to NVM are processed. In manufacturing mode 66, all commands are processed. An access level is assigned to every command that is processed by the vault. Passwords are assigned to the various access levels. For example, to enter service mode 62 from the normal mode 60, a service password is required. Another password is required to enter privileged mode 64. Thus, two passwords, service and privileged, must be entered to access privileged mode 64. Privileged mode 64 cannot be accessed from normal mode 60 or manufacturing mode 66.

When a 'blank' vault is manufactured, a manufacturing vendor puts vault 20 in manufacturing mode 66 to program the NVM 46 of PCMCIA card 30. NVM 46 is programmed with encryption, accounting, funds management and other vault software modules. Then the vendor locks a serial number in NVM 46, prohibiting any unauthorized access to NVM 46, before delivering PCMCIA card to a user. The vendor programs vault 20 to default to normal mode 60 whenever power is applied. A manufacturing mode password is required, i.e. vault 20 must be in manufacturing mode, to unlock the serial number in vault 20.

Commands From the PC to Control the Vault

Power

Figure 6:
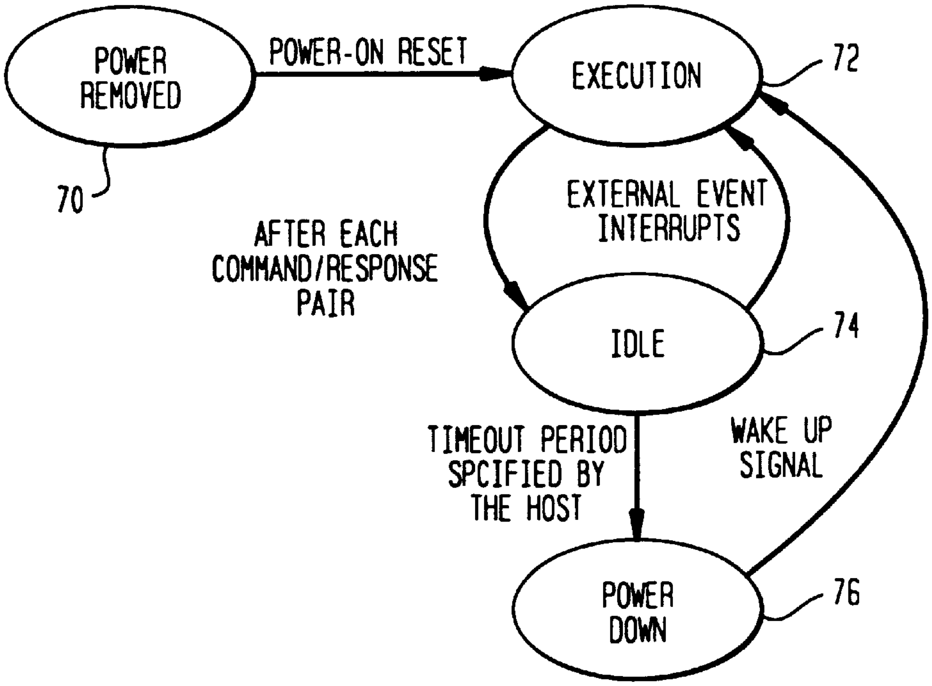
FIG. 6 is a flow diagram of power state transitions of the vault card in the PC-based metering system of FIG. 1.

PCMCIA card does not include a self contained power source. Power to PCMCIA card is controlled by PC 12 in a conventional manner. When a user inserts vault 20 into PCMCIA controller 32 of PC 12, PC 12 software is in full control of electric power to vault 20. Microprocessor 44 in PCMCIA card is always in one of the four states: power removed 70, execution 72, idle 74, or power-down 76. Microprocessor 44 enters the execution state 72 each time it performs a task specified in a command from PC 12. Microprocessor 44 enters the idle state 74 after performing such task. Microprocessor 44 enters the power-down 76 if the system remains idle longer than the user specified idle time. To exit power-down state 76, an external signal from PC 12 wakes up microprocessor 44. Microprocessor 44 is in the power removed state 70 whenever PCMCIA card is removed from PCMCIA controller 32 or whenever PCMCIA controller 32 disables power to PCMCIA card. FIG. 6 shows the state transitions for power controls.

Status messages communicate the status of vault 20 to PC 12. The status messages also serve as acknowledgment or failure to acknowledge a given command by PC 12.

Dynamic Link Library Control of the Vault

In accordance with the present invention, the functionality of DLL 40 is a key component of PC-base meter 10. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. The present invention encapsulates all the processes involved in metering, and provides an open interface to vault 20 from all Windows-based applications capable of using a dynamic link library. In accordance with the present invention, any application program 36 can communicate with vault microprocessor 44 in PCMCIA card 30 through DLL 40.

In accordance with the present invention, DLL 40 includes the following software sub-modules: secure communications 80, transaction capture 82, secure indicia image creation and storage 84, and application interface module 86.

Secure Communications

Figure 7:
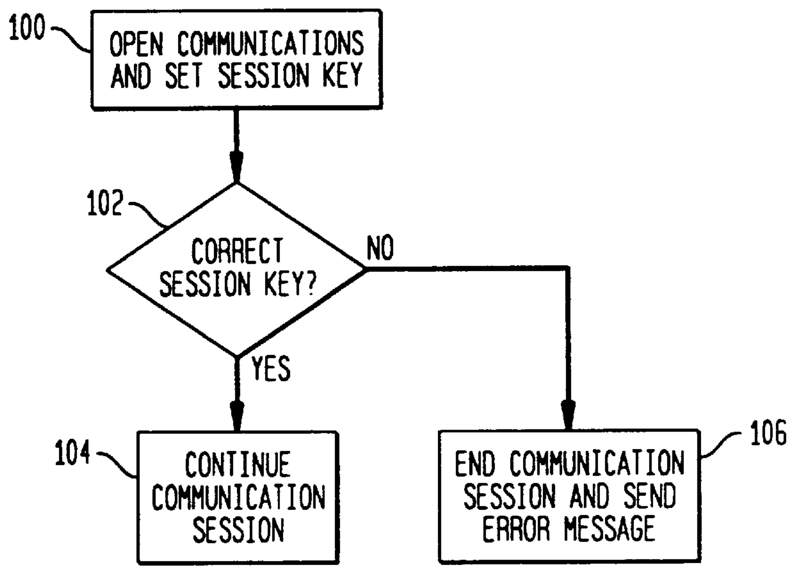
FIG. 7 is a flow chart of the Secure Communications sub-module in the PC-based metering system of FIG. 1.

Since vault 20 is not physically secured to PC 12, it would be possible for a user to replace one vault 20 attached to PC 12 with another vault 20 while a vault transaction is in process. The Secure Communications sub-module 80 prevents this from happening by maintaining secure communication between DLL 40 and vault 20. Referring now to FIG. 7, the Secure Communications sub-module 80 identifies a specific vault 20 when it opens a communication session through PCMCIA controller 32, and maintains communication data integrity with the specific vault during the entire communication session. When a communication session is initiated DLL 40 and vault 20 negotiate a session key at step 100. All the messages thereafter are encoded/decoded using the session key which is used for only the one particular communication session. Whenever the session key changes during the communication session, the communication session terminates and an error message is sent to the user at step 106. The use of session keys is described in Applied Cryptography by Bruce Schneier, published by John Wiley and Sons, Inc., 1994. Thus, the session key not only provides secure encrypted communication between DLL 40 and vault 20, but also prevents another vault (PCMCIA card 30) from replacing the vault 20 that began a communication session, because the other vault does not have the session key negotiated at the beginning of the communication session. Secure Communications sub-module 80 also controls secure communications with the postal data center, for example, during refills of the accounting registers in vault 20.

Transaction Captures

Figure 8:
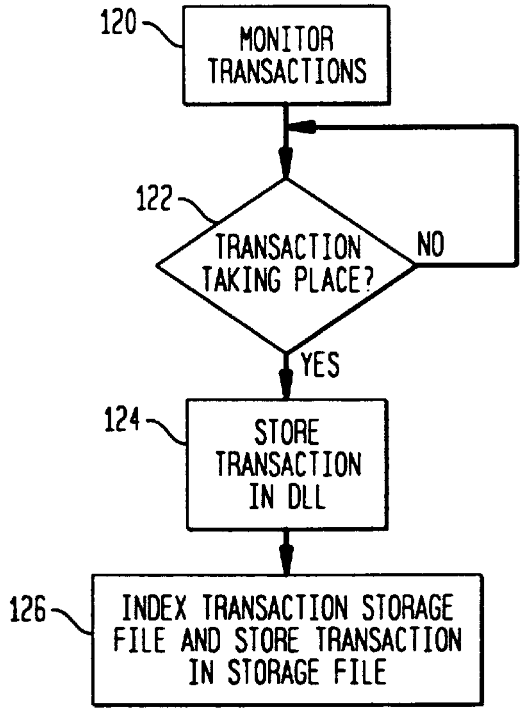
FIG. 8 is a flow chart of the Transaction Capture sub-module in the PC-based metering system of FIG. 1.

Conventional postage meters store transactions in the meter. In accordance with the present invention, Transaction Capture sub-module 82 captures each transaction record received from vault 20 and records the transaction record in DLL 40 and in DLL storage area 41 on hard drive 24. If there is ample room on hard drive 24, such transaction captures can be stored for a plurality of different vaults. Referring now to FIG. 8, from the moment that a communication session is established, Transaction Capture sub-module 82 monitors message traffic at step 120, selectively captures each transaction record for token generations and refills, and stores such transaction records in DLL 40 at step 124 and in an invisible and write-protected file 83 in DLL storage area 41 at step 126. The information stored for each transaction record includes, for example, vault serial number, date, piece count, postage, postal funds available (descending register), tokens, destination postal code and the block check character. A predetermined number of the most recent records initiated by PC 12 are stored in file 83 which is an indexed historical file. In the preferred embodiment file 83 is indexed according to piece count but may be searched according to addressee information. File 83 represents the mirror image of vault 20 at the time of the transaction except for the encryption keys and configuration parameters. Storing transaction records on hard drive 24 provides backup capability which is described below.

Indicia Image Creation and Storage

In a closed metering system, such as conventional postage meters, the indicia is secure because the indicia printer is dedicated to the meter activity and is physically secured to the accounting portion of the meter, typically in a tamper-proof manner. In an open metering system, such as the present invention, such physical security is not present.

Figure 9:
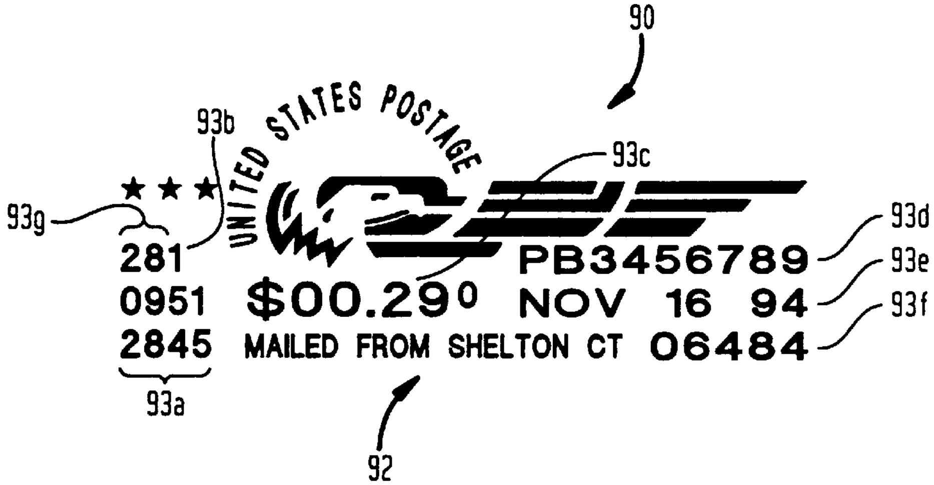
FIG. 9 is an representation of indicia printed by the PC-based metering system of FIG. 1.

In accordance with the present invention, the entire fixed graphics image 90 of the indicia 92, shown in FIG. 9 is stored as compressed data 94 in DLL storage area 41. Postal data information, including piece count 93_a_, vendor ID 93_b_, postage amount 93_c_, serial number 93_d_, date 93_e_ and origination ZIP 93_f_ and tokens 93_g_ are combined with the fixed graphics image 90 by Indicia Image Creation Module 84.

Figure 10:
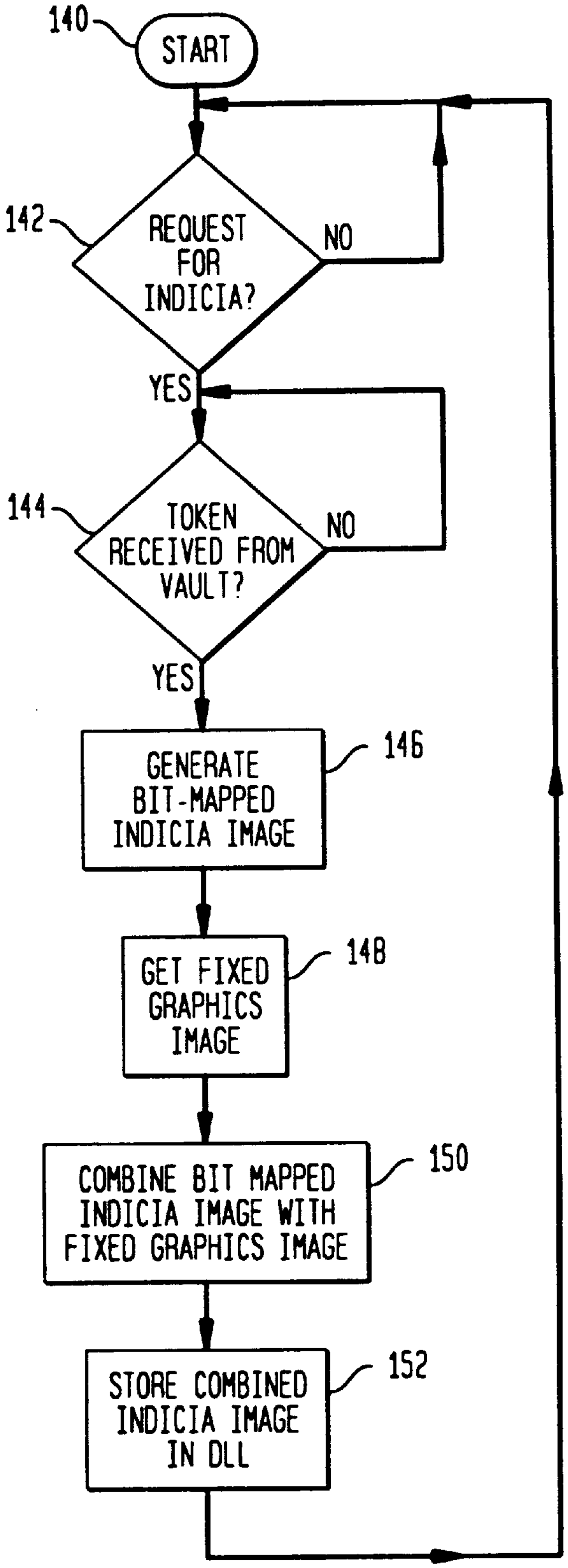
FIG. 10 is a flow chart of the Secure Indicia Image Storage sub-module in the PC-based metering system of FIG. 1.

Referring now to FIG. 10, when a request for indicia is made from an application program in PC 12 at step 142, Indicia Image Creation Module 84 checks for a digital token from vault 20 at step 144, and at step 146 generates a bit-mapped indicia image 96 by expanding the compressed fixed graphics image data 94 at step 148 and combining at step 150 the indicia's fixed graphics image 90 with some or all of the postal data information and tokens received from vault 20. At step 152, the indicia image is stored in DLL 40 for printing. Sub-module 84 sends to the requesting application program 36 in PC 12 the created bit-mapped indicia image 96 that is ready for printing, and then stores a transaction record comprising the digital tokens and associated postal data in DLL storage area 41.

Thus, the bit-mapped indicia image 96 is stored in DLL 40 which can only be accessed by executable code in DLL 40. Furthermore, only the executable code of DLL 40 can access the fixed graphics image 90 of the indicia to generate bit-mapped indicia image 96. This prevents accidental modification of the indicia because it would be very difficult for a normal user to access, intentionally or otherwise, the fixed graphics image 90 of the indicia and the bit-mapped indicia image 96.

Application Interface

The Application Interface sub-module 86 provides the following services when requested by an application program 36 in PC 12. Application program 36 accepts user data through user interface module 42 and prints indicia on an envelope or on a label. In the preferred embodiment of the present invention, such application program 36 would be an off-the-shelf software module, such as a word processor or spreadsheet, that can access DLL 40. In an alternate embodiment application program 36 could be a software module dedicated solely to accept user data and print indicia on an envelope or on a label. Application Interface sub-module 86 provides the destination ZIP data and associated postal data needed to create the indicia. Application Interface sub-module 86 requests available postage from vault 20 and reports the available postage to the requesting application program 36.

When vault 20 is refilled with postage funds from the data center, Application Interface sub-module 86 requests from vault 20 the access code required for refills and reports the access code received to the Secure Communications sub-module 80 which initiates communications with the data center. Application Interface sub-module 86 initiates the refill and provides the amount and combination to vault 20. DLL 40 reports the result to the requesting application program 36 which acknowledges the refill to the user.

Application Interface sub-module 86 processes a request for indicia received from application program 36 and forwards the request to Indicia Image Creation and Storage sub-module 84. Application Interface sub-module 86 provides postal data, including date, postage, and a destination postal code, such as an 11 digit ZIP code, to Indicia Image Creation and Storage sub-module 84 which then generates a bit-mapped indicia image 96. Application Interface sub-module 86 reports to application program 36 that the bit-mapped indicia image 96 is ready for printing.

Backup on Hard Drive

Vault 20 must be a secure device because it contains the accounting information of the amount of postage remaining in the vault and the postage printed. However, the very nature of the security makes it hard to recover postal funds in the event a malfunction occurs and the vault cannot be accessed by normal operation. The present invention enhances the reliability of a PC meter system by using the hard disk of the user PC to backup the accounting information of the vault. As previously described, the transaction capture sub-module 82 stores transaction files as backup files on hard drive 24. This provides a benefit that certain functions, such as account reconciliation, can be performed even when vault 20 malfunctions. Such backup is unavailable in conventional postage meters.

For further security, the backup transaction files can be encrypted before being stored on hard drive 24 to prevent tampering. The number of transactions that are maintained on hard drive 24 is limited only by the available storage space on hard drive 24. Preferably, at least all transactions since the last refill would be maintained as backup.

A detailed description of recovery from vault malfunction is disclosed in U.S. patent application Ser. No. 08/574,743, previously noted, which is incorporated herein in its entirety by reference.

Operation of the PC Meter

Generally, the first action by a user after powering up a conventional meter is setting the time and date of the meter. Setting the date is necessary to generate derived keys which are used to generate the digital tokens. (Some recent meters have a real time clock internal to the meter in which case the time and date need only be set once.) The present invention spares the user from having to set the vault date.

As previously described, vault 20 does not have an independent power source and therefore cannot have a continuous running real-time clock. The date must be set every time the vault is powered-up. Power is applied to vault 20 only when it is plugged into PC 12. Thus, the date would normally be entered by the user through PC 12 each time vault 20 is plugged into PCMCIA controller 32. Since the PC to which the vault is connected has a real-time clock, the date setting process may be automated and made transparent to the user. In accordance with the present invention, the time and date set in PC 12 is sent to vault 20 each time power is initially applied to vault 20. The vault date is used by DLL 40 to generate the indicia. The vault date may be changed at any time by the user to facilitate post-dating of mail.

Upon application of power to vault 20 by PCMCIA controller 32, the date of PC 12 is obtained through user interface 42. The date is then translated into the correct format and sent to vault 20 which then sets its date, calculates its date dependent token keys and returns its status and the token keys to PC 12. Additionally, a default postage amount (e.g. First Class Postage) may be set in a similar manner. This method enables PC meter system 10 immediately when vault 20 is plugged into PC 12 without the user having to manually set parameters. The user may change the vault date (in order to post date mail) or the default postage amount at any time.

In an alternate embodiment, PCMCIA card has its own internal clock that is automatically set with the time and date in PC 12 each time PCMCIA card is inserted into PCMCIA controller 32.

In the preferred operation, a user of an application program 36, such as a word processor, highlights a recipient address from a letter or mailing list displayed on display 14. The user requests the printing of an envelope with indicia. A dialog box appears on display 14 indicating the default postage amount which the user may accept or modify. When the postage amount is accepted, the entire envelope is previewed with all addressing, bar-coding and indicia shown on the envelope. At this point the user can print the envelope as shown or correct any errors that are seen in the preview.

From the display 14 and keyboard 16, the user can change postage amount, date and address information. The user can also select and customize a return address, slogan, logo and greeting that may be printed with the indicia. The present invention also provides from the application program 36 the ability for a user to check funds available in vault 20 and to initiate 36 the automatic refilling of the PC meter through modem 29. PC meter system 10 also includes the capability of interfacing with optional software, such as postal rate calculation and address hygiene, that improves the performance of PC meter system 10.

PC meter system 10 provides capabilities that are not available with conventional postage meters. For example, a user can scan in addressee information; generate indicia for a batch of envelopes before printing any of the envelopes; observe an image of the envelope to be printed, including addressee information and indicia, before printing the envelope; and customize slogans, logos and greetings to be printed with the indicia on the envelope.

Most personal bills received in the home today come with self-addressed, reply envelopes. A user may desire to use PC meter system 10 to apply open system indicia to the self-addressed, reply envelopes. Since the open system indicia includes addressee information, the user can type such addressee information into PC 12 before requesting indicia. This task can be simplified by using a conventional optical scanner connected to PC 12 for scanning in the unique addressee information printed on the reply envelope. PC meter system 10 uses such unique addressee information to generate tokens for the indicia. PC meter system 10 then prints the indicia to a label printer or label printed on a conventional printer, or prints a completely new envelope with the scanned address. The label with indicia printed on it, could then be applied to the self-addressed, reply envelope. Using a scanner in this manner eliminates the need for a user to manually enter information from the self addressed envelope which is a slower method that has a higher potential for error. Such error in entering addressee information could result in indicia that fails open system verification by the Post Office. It will be understood that the scanner can also be used for scanning in addresses from a printed mailing list. Finally, if the envelope was prepared previously or at another PC, the addressee information can be scanned as described above.

As previously described, in PC meter system 10 the printer is not dedicated to the metering function and the indicia are stored in PC 12 before printing. Thus, indicia can be generated individually or for a batch of addressees and then printed at a later time at the user's discretion. Such delayed printing and batch processing is described in more detail in co-pending U.S. patent application Ser. No. 08/575,104, previously noted, which is incorporated herein in its entirety by reference.

As with any document prepared in a Windows-based PC system, a user may observe, through the application program 36 in which an envelope was created, an image of a fully prepared envelope or batch of envelopes to be printed, including addressee information and indicia, before printing any of the envelopes. In addition, PC meter system 10 provides a user with the ability to customize return addresses, slogans, logos and greetings that are to be printed with the indicia on the envelope.

In an alternate embodiment of PC meter 10, the electronic vault is in an IC token, such as manufactured by CDSM of Phoenix, Ariz., that is inserted into a token receptacle of a PCMCIA card and programmed to operate as the vault in a similar manner as described for PCMCIA card 30. In another alternate embodiment, the electronic vault is in a smart diskette, such as manufactured by SmartDisc Security Corp. of Naples, Fla. that is programmed to operate in a similar manner as described for PCMCIA card 30.

In another alternate embodiment of PC meter 10, the electronic vault is a tamper proof, hardware peripheral, such as a dongle, that is attached to a serial, parallel or SCSI port of the PC. In yet another alternate embodiment, not shown, the vault is internal to PC 12, for example a separate chip within PC 12 that functions in a manner similar to vault 20.

In yet another alternate embodiment of a PC-based metering system, PC 12 is a host computer in a network serving a plurality of users in which the vault is active within the host computer and requests for indicia originate from and printing of indicia occur at a local PC. Such alternate embodiment is disclosed in co-pending U.S. patent application Ser. No. 08/575,109 previously noted, which is incorporated herein in its entirety by reference.

Figure 11:
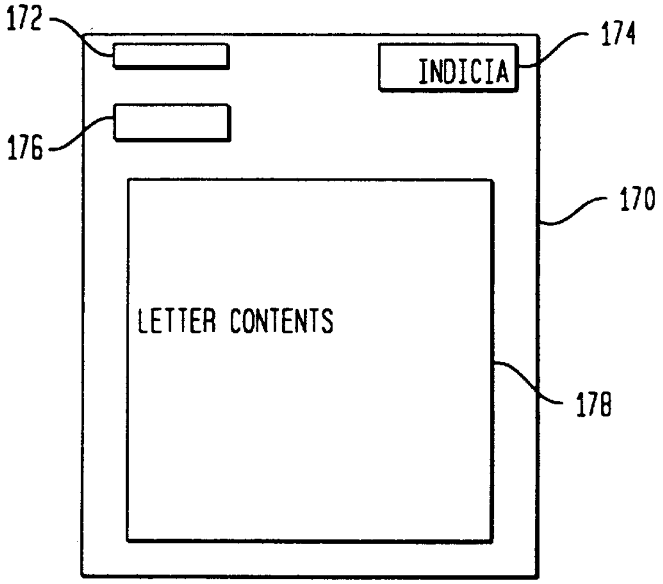
FIG. 11 is a diagrammatic representation of a document printed by the PC-based metering system of FIG. 1 with indicia printed thereon.
Figure 12:
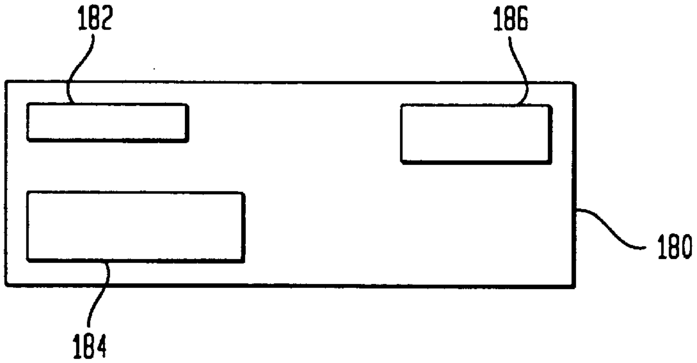
FIG. 12 is a diagrammatic representation of a three windowed envelope in which the document of FIG. 11 is inserted with the indicia showing through one of the windows.

Finally, the present invention provides an alternate method of postage evidencing which eliminates the need to print anything on an envelope. PC meter system 12 can print an open system indicia on a letter itself as shown in FIG. 11. The format of such a letter 170 includes a return address 172 in the upper left corner, an open system indicia 174 in the upper right corner, a destination address 176 below the return address, and the body of the letter 178 below the destination address. Using a windowed envelope 180 with three windows, as shown in FIG. 12, the return address is visible through an upper left corner window 182, the destination address is visible through a lower left window 184, and the indicia is visible through an upper right window 186. It will be understood that the present invention can be used to print indicia anywhere on the letter or document being printed to accommodate alternately configured windowed envelopes, such as a single, large windowed envelope. The present invention is also suitable for printing indicia on a one piece mailer. The foregoing method of mailing a letter with indicia printed directly on the letter and visible through a window of the envelope eliminates a finishing step in production mail relating to matching a separately printed envelope with its corresponding letter. It has been a challenge to insert a letter to the corresponding envelope when the letters and envelopes are printed separately. Thus the present invention simplifies and eliminates errors in the mail preparation process.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A transaction evidencing system, comprising a personal computer (PC), an unsecured printer and portable vault means removably coupled to said PC, and user interface means, said PC including a processor, memory and storage means, said storage means including at least one non-metering application program that is selectively run on said PC, said unsecured printer connected to said PC for printing in accordance with said non-metering application program, said portable vault means including digital token generation means and transaction accounting means, the system comprising:

vault interface means in said PC for effecting communications between said portable vault means and said non-metering application program and for performing metering functions other than metering functions performed in said portable vault means, said vault interface means comprising:

an application interface module for interfacing with said non-metering application program;

a communications module for communicating with said portable vault means;

an indicia image creation and storage module for generating indicia bitmaps and storing said indicia bitmaps in said storage means; and a transaction capture module for storing in said storage means transaction records generated in said portable vault means.

2. The transaction evidencing system of claim 1 wherein said portable vault means comprises a vault card that is removably coupled to said PC, said PC including means for removably coupling said vault card to said PC.

3. The transaction evidencing system of claim 2, wherein said vault card is a PCMCIA card.

4. The transaction evidencing system of claim 1, wherein said vault interface means are part of a dynamic link library module in said PC.

5. The transaction evidencing system of claim 1, wherein said storage means is a hard drive of said PC.

6. The transaction evidencing system of claim 1, wherein said portable vault means is programmed with a plurality of security access levels including at least a default mode for normal user access and at least one restricted mode that is accessed by password.

7. The transaction evidencing system of claim 1, wherein a batch of digital tokens may be generated before any indicia bitmaps corresponding to said batch of digital tokens are generated.

8. The transaction evidencing system of claim 1, wherein said transaction record is encrypted before being captured in said storage means.

9. The transaction evidencing system of claim 1, wherein a plurality of consecutive ones of said transaction records are stored in said storage means as backup to information stored in said portable vault means.

10. The transaction evidencing system of claim 1, further comprising means coupled to said PC for scanning addressee information for selection by said non-metering application program when requesting indicia.

11. The transaction evidencing system of claim 1, wherein said vault interface means provides said indicia bitmap to said non-metering application program for viewing an image of said indicia bitmap on a display coupled to said PC before printing said indicia bitmap.

12. The transaction evidencing system of claim 1, wherein said indicia image creation and storage module generates a postage indicia bitmap.

13. The transaction evidencing system of claim 1, wherein said indicia image creation and storage module generates said indicia bitmap by combining indicia graphics stored in said storage means with said digital token and said predetermined information.

14. The transaction evidencing system of claim 1 wherein said application interface module issues a request for at least one digital token in response to a request for indicia from said non-metering application program, said request for digital token including predetermined information required by said token generation means, said communications module sends said request for digital token and said predetermined information to said portable vault means and receives from said portable vault means a transaction record including a digital token generated by said token generation means, said indicia image creation and storage module generates an indicia bitmap from said digital token and stores said indicia bit map, said transaction capture module stores said transaction record said application interface module provides said indicia bitmap to said non-metering application program.

15. The transaction evidencing system of claim 14 wherein said communications module maintains communication data integrity with said portable vault means through the use of a session key for each transaction evidencing communication session relating to a request for and receipt of a digital token.

16. The transaction evidencing system of claim 15 wherein said communications module also controls secure communications with a postal data center during refills of accounting registers in said transaction accounting means of said portable vault means.

17. The transaction evidencing system of claim 16 wherein said portable vault means comprises a plurality of portable vault devices, any one of which may be coupled to said PC for each transaction evidencing communication session, and wherein said transaction capture module monitors communications between each of said vault devices and said communications module and stores in said storage means all transaction records and refill accounting information received by said communications module for each of said vault devices, whereby said storage means is a backup of information stored in said vault devices.

18. A method of implementing a transaction evidencing system on a personal computer (PC) having a display and an unsecured printer operatively coupled thereto, comprising the steps of:

providing a portable vault that is removably coupled to the personal computer, said portable vault operating as a secure accounting module of the transaction evidencing system;

requesting indicia for a particular document being processed in an application program running in the PC;

establishing a session key for use in all communications between the portable vault and the PC relating to the request for indicia;

sending to said portable vault from an application interfacing module in the PC, in response to said request for indicia, a request for at least one digital token and a predetermined set of information relating to the particular document;

issuing in said portable vault at least one digital token and sending the digital token to an indicia generating module in the PC;

storing the digital token and the predetermined set of information in a transaction record;

generating an indicia bitmap using the transaction record; and providing the indicia bitmap to the application program when the application program is ready to print the indicia.

19. The method of claim 18, comprising the further step of:

viewing on a PC display an image of at least a part of the particular document with the indicia shown thereon before printing the particular document.

20. The method of claim 18, comprising the further step of:

storing a plurality of transaction records on the hard drive, each of the transaction records corresponding to transactions occurring in said portable vault.

21. The method of claim 18, comprising the further steps of:

providing a dynamic link library (DLL) containing routines for controlling communications with the portable vault, storing transactions, storing indicia bitmaps, and application interfacing;

loading the DLL into the memory of the PC when an indicia request is made from the application program; and accessing the DLL from the application program.

22. The method of claim 18, comprising the further steps of:

selecting in the application program recipient address information for in the application program;

selecting in the application program an amount of postage to be printed on in the application program;

including the recipient address information and the amount of postage as part of the predetermined set of information; and printing said recipient address and said indicia on an envelope.

23. The method of claim 18, comprising the further steps of:

printing the indicia directly on the document; and inserting the document into an envelope such that the indicia is visible through a windowed portion of the envelope.

* * * * *